Figure 1:
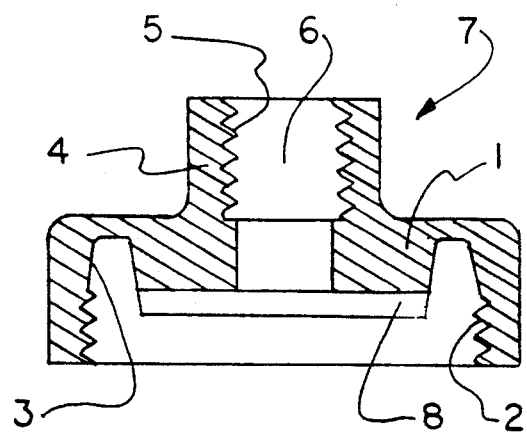

United States Patent [19]
Elliott, Jr.

[11] Patent Number: 5,152,150
[45] Date of Patent: Oct. 6, 1992

[54] REMOVAL OF VOLATILE ORGANIC POLLUTANTS FROM DRINKING WATER

[76] Inventor: Robert H. Elliott, Jr., 6027 Cannon Hill Rd., Fort Washington, Pa. 19034

[21] Appl. No.: 693,565

[22] Filed: Apr. 30, 1991

Related U.S. Application Data

[63] Continuation of Ser. No. 581,676, Sep. 13, 1990, abandoned, which is a continuation of Ser. No. 395,568, Aug. 18, 1989, abandoned.

[51] Int. Cl.⁵ .............................. F25B 19/00
[52] U.S. Cl. .................................... 62/100
[58] Field of Search ............... 62/100, 338; 203/11

[56] References Cited

U.S. PATENT DOCUMENTS

| | | | |
|---|---|---|---|
| 2,121,281 | 6/1938 | Bosque | 62/338 X |
| 2,274,409 | 2/1942 | Harbison | 62/338 X |
| 2,358,559 | 9/1944 | Clemens | 203/11 X |
| 3,208,641 | 9/1965 | Brugioni | 62/338 X |
| 4,366,030 | 12/1982 | Anderson | 203/11 |
| 4,848,748 | 6/1989 | Agnihotri et al. | 203/11 X |

*Primary Examiner*—William E. Tapolcai
*Attorney, Agent, or Firm*—Frederick J. Olsson

[57] ABSTRACT

Volatile, toxic organic pollutants are removed from drinking water by partially filling a container with water and drawing a vacuum in the space above the water so that the pollutants exit the water into the space above the water for subsequent dispersement into the atmosphere.

6 Claims, 1 Drawing Sheet

REMOVAL OF VOLATILE ORGANIC POLLUTANTS FROM DRINKING WATER

This application is a continuation of patent application Ser. No. 581,676, filed Sept. 13, 1990, now abandoned which was a continuation of application Ser. No. 395,568 filed Aug. 18, 1989 and now abandoned.

This invention relates to health care and especially to prevention of the ingestion of toxic organic carcinogens.

More particularly, the invention relates to method for the removal of volitale toxic organic carcinogens from drinking water.

The invention contemplates the use of standard conventional equipment for carrying out the methods whereby removal can be effected simply and inexpensively at home with water from the tap or with water from commercially purchased bottled water.

The potable water in the United States has been increasing in organic pollutants since the early fifties. The Environmental Protection Agency was formed in 1972 and they have found several hundred toxic organics in our drinking water, which are called TTOs or total toxic organics. Many companies have tried to make purifiers for the home owners to remove the various pollutants.

Ion exchange units were introduced on the market, but only removed metals. The systems were beneficial with respect to removal of sodium for heart patients but at the same time removed calcium which is essential to good health. Another alarming attribute was that if ion exchange resin was swallowed, it could cause liver cancer and the resin did nothing for the removal of the TTOs, which are considered the most important aspect of the problem. Charcoal will absorb the toxic organics, but the removal capacity is so limited that the unit must be kept off the main stream of the water and used only for drinking water. This criteria is also the downfall of such a system. I have found that a charcoal unit guaranteed for five years gave off more TTOs than it removed after six months of operation.

For illustration, the incoming stream contained 2 parts per billion (ppb) of methylene chloride, 1 ppb of trichlorethylene and 3 ppb of chloroform. After going through the charcoal and very fine filter, the answer was surprising.

| | |
|---|---|
| Methylene chloride | 6.3 parts per billion |
| Trichloroethylene (TCE) | 2.7 parts per billion |
| Chloroform | 4.5 parts per billion |

A good quality filter was used to stop any possible fragments of charcoal getting through. The instrument to measure these toxic organics is a GC/MS, which stands for gas chromatograph with mass spectroscopy detection. Various other detectors can be used in place of the mass spectroscopy. The normal sensitivity is 0.5 parts per billion for the chlorinated compounds.

The above tests were tried under varying conditions and it seemed the charcoal loaded up very quickly. A scientist in Washington wrote an article on this phenomenon, which he called the wave effect. Even if the carbon was not saturated, the idle water surrounding the absorbing bed would become saturated with the various pollutants. When flushed the water that was supposed to be safe, was now more polluted than the original. Flushing for one minute or maybe two minutes might clear the charcoal bed, but who wants to play Russian roulette with cancer.

People want a positive answer when it comes to removal of cancer causing agents or carcinogens from their drinking water. Taking a quart or two from an ordinary tap and boiling the water will remove the volatile compounds, such as methylene chloride, TCE and chloroform. Unfortunately, the water tastes bad, the process uses energy and the process is awkward and time consuming.

I have found a simpler way to remove the pollutants. Add 1-½ quarts of tap water to a glass jar so that it is ¾ full and leave it out overnight on the counter so that the water assumes the room temperature. Tap the bottle and screw the cap on tightly and place in the refrigerator for at least eight hours. The drop in temperature will cause a vacuum in the glass bottle and pull the carcinogens out of the water. Heating the glass bottle slightly (150° F.) will create a better vacuum. The foregoing may be accomplished by any conventional method.

Illustration 2

| | | |
|---|---|---|
| Boston tap water | 4.5 ppb | TCE |
| After vacuum | not detected | (less than .5 ppb) |
| Philadelphia tap water | 30 ppb | chloroform |
| | 6 ppb | methylene chloride |
| | 1.4 ppb | TCE |
| After vacuum | not detected | (less than .5 ppb) |
| Orlando, FL tap water | 3.1 ppb | TCE |
| | 1.8 ppb | chloroform |
| After vacuum | not detected | (less than .5 ppb) |

Illustration 2

I gave the instructions to a local water company. After several days they called and said the process did not work. Further investigation revealed that they pulled a vacuum with a pump for only ten minutes and the results were

| | | |
|---|---|---|
| Water company | 2.1 ppb | chloroform |
| After vacuum (10 Min.) | 2.0 ppb | |

After trying many combinations, it appeared that five hours were needed to bring the chloroform down to the detection limit.

| | | |
|---|---|---|
| Water company sample | 2.1 ppb | chloroform |
| After vacuum | .5 ppb | chloroform |

It appears that it is important to lower temperature and pressure together and slowly.

| | | |
|---|---|---|
| Water company sample | 35° F. | 2.1 chloroform |
| After vacuum 8 hours | 35° F. | No detection |

Some research was devoted to placing a vacuum pump in a refrigerator and this proved successful but very expensive. A bottle and vacuum gauge would be less than $25.00 whereas a vacuum pump would be over $500.00. On a mass production basis the costs would be greatly reduced and the TTOs vented outside the refrigerator.

In recent months I have asked a number of people to try a set of bottles with vacuum gauge and without it.

They definitely wanted the vacuum gauge. It was found the sealing ability of the screw caps was soon lost and the possibility of preventing cancer by the removal of the carcinogens was too important to fool with. A positive measure of the vacuum in the bottle was essential.

The problem of losing the vacuum after 20-30 turns was solved by using a specially designed cap. While I am not ruling out the possibility of using metal caps, it appeared likely a plastic cap would hold up for 1000 openings and closings. There was less chance of an off-taste with plastic caps. Many testers remarked that the water tasted better than bottled water.

This prompted me to check several different bottled waters.

| BOTTLED WATER NON CARBONATED | | |
| --- | --- | --- |
| Sample A | chloroform | 17.4 ppb. |
| | carbon tetrachloride | 2.1 ppb. |
| Sample B | methylene chloride | 3.9 ppb. |
| | toluene | .6 ppb. |
| Sample C | methylene chloride | 4.6 ppb. |
| | bromodichloromethane | 2.1 ppb. |
| | 1,1,1-trichloromethane | 1.8 ppb. |
| | chloroform | 1.7 ppb. |

Pulling a vacuum by cooling in a refrigerator overnight proved to lower all carcinogens below the detection point.

With respect to the above mentioned specially designed cap, a typical cap is illustrated in FIG. 1. The cap has a body 1 lower internal threads 2, a cavity 3 designed to accept the tops of the neck of a water bottle or container, a neck 4 having internal threads 5 and opening 6. The neck 4 and threads 5 constitute a fitting 7 to which can be attached the stem of vacuum gauge on a vacuum pump.

The annular lip 8 extends down into the bottle or container and when the cap or cover is tightened down it measurably enhances the seal.

The container referred to above can be formed from glass or plastic provided the material has the rigidity to withstand vacuum. If cap is to be molded from plastic I prefer polypropylene.

It will be appreciated that a vacuum gauge or a vacuum pump can easily secured to the fitting 7. Naturally, the fitting can be plugged up in the event a vacuum gauge is not desired and/or the vacuum is not to be created by a pump.

I have referred to the components for removing the pollutants as conventional and standard. This is true of the GC/MS equipment even though this equipment is not ordinarily available in a dwelling. With respect to GC/MS equipment it is contemplated that the container for water and it's cap or cover be precalibrated.

If the container and cap are to be used with a vacuum pump, information on the vacuum level and the time under vacuum for desired removal are provided. Normally this will be 6-7 inches of mercury held for about 8 hours.

If the container (with cap or cover) is to be set up in a refrigerator for the vacuum creation, information on the desired refrigerator temperature and the time to be spent in the refrigerator for desired removal are provided.

With respect to time and temperature the following chart will provide a guide.

| Inches of Mercury | Time (hours) | Temp (°F.) |
| --- | --- | --- |
| 4 | 48 | 35 |
| 5 | 24 | 35 |
| 6 | 10 | 35 |
| 7 | 8 | 35 |

With respect to the testing time period with GC/MS equipment the following is to be noted.

When a container is taken from the refrigerator and a sample removed and tested in the GC/MS equipment it will be necessary to return the container to the refrigerator if the reading is more than ½ part per billion. Before returning the container to the refrigerator, water should assume room temperature. This may be done by leaving the container out of the refrigerator overnight.

Before closing I want to note that the volatile pollutants in the space above the water are dispersed into the atmosphere when the container cover is removed. This is not detrimental in as much as the density in the atmosphere is negligible as compared to the density in the water.

I claim:

1. The method volatile organic substances from drinking water comprising the steps of:
   providing a container which can be opened and closed, and which is constructed, when closed, to contain water and to sustain an internal vacuum;
   providing drinking water and opening said container and partially filling the container with drinking water so there is an open space and then closing the container;
   permitting the drinking water in said closed container to assume a temperature at least as high as room temperature;
   providing refrigeration means with an internal temperature between 32 F. and 40 F.; and
   when the drinking water in said closed container is at least as high as room temperature, placing said closed container inside of said refrigeration means for a period of time to create a vacuum in said space so that volatile toxic organic substances in said drinking water exit from the water and enter said space.

2. The method according to claim 1 wherein said container is provided with a gauge to measure and indicate the amount of vacuum in said space.

3. The method of claim 1 wherein said period of time is determined by:
   providing GC/MS equipment;
   removing said container from said refrigeration means;
   removing a quantity of drinking water from the container and testing in said GC/MS equipment to determine whether the quantity of any organic substance in the drinking water is more than ½ part per billion; and
   if the quantity of any organic substance in the drinking water is more than ½ part per billion, closing said container and permitting the temperature of the water to rise at least to room temperature and then returning the container to said refrigerator and subsequently repeating said test.

4. The method of claim 2 wherein said period of time is determined by:
   providing GC/MS equipment;
   removing said container from said refrigerator means;

and removing a quantity of drinking water from the container and testing in said GC/MS equipment to determine whether the quantity of any organic substance in the drinking water is more than ½ part per billion; and if the quantity of any organic substance in the drinking water is more than ½ part per billion, closing said container and permitting the temperature of the water to rise at least to room temperature and then returning the container to said refrigerator and subsequently repeating said test.

5. The method of removing volatile, toxic organic pollutants from drinking water by containing the water with a space above the surface of the water and creating a vacuum in the space above the surface of the water so that the pollutants exit from the water and enter the space by providing for said drinking water to assume a temperature at least as high as room temperature and lowering the drinking water temperature to between 32 F. and 40 F. and during said temperature lowering operating a vacuum pump connected to said space, the vacuum pump being capable of creating a vacuum above 6 inches of mercury.

6. The method removing toxic volatile organic substances from drinking water comprising the steps of:

providing a container which can be opened and closed, has fitting means for connecting the interior of the container to a vacuum pump, and which is constructed, when closed, to contain water and to sustain an internal vacuum;

providing drinking water and opening said container and partially filling the container with drinking water so there is an open space;

permitting the drinking water in said closed container to assume a temperature at least as high as room temperature;

providing a vacuum pump which can create a vacuum above 6 inches of mercury;

providing refrigeration means with an internal temperature between 32 F. and 40 F.; and closing said container and connecting said fitting to said vacuum pump; and when the drinking water in said closed container is at least as high as room temperature, placing said closed container inside of said refrigeration means and operating said vacuum pump to create a vacuum in said space so that volatile, toxic organic substances in said drinking water exit from the water and enter said space.

* * * * *